(12) United States Patent
Liu et al.

(10) Patent No.: US 9,766,399 B2
(45) Date of Patent: Sep. 19, 2017

(54) CROSS WAVEGUIDE

(71) Applicant: Huawei Technologies Co., Ltd., Shenzhen, Guangdong (CN)

(72) Inventors: Wanyuan Liu, Wuhan (CN); Xin Tu, Wuhan (CN); Hongyan Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/406,182

(22) Filed: Jan. 13, 2017

(65) Prior Publication Data
US 2017/0123155 A1    May 4, 2017

Related U.S. Application Data

(63) Continuation of application No. PCT/CN2014/082325, filed on Jul. 16, 2014.

(51) Int. Cl.
*G02B 6/12* (2006.01)
*G02B 6/13* (2006.01)
*G02B 6/125* (2006.01)
*G02B 6/122* (2006.01)
*G02B 6/136* (2006.01)

(52) U.S. Cl.
CPC ........... *G02B 6/125* (2013.01); *G02B 6/1228* (2013.01); *G02B 6/136* (2013.01); *G02B 2006/12061* (2013.01)

(58) Field of Classification Search
CPC ...... G02B 6/125; G02B 6/1228; G02B 6/136; G02B 6/12061

USPC ................. 385/123, 129, 130, 131
See application file for complete search history.

(56) References Cited

U.S. PATENT DOCUMENTS

| | | | | |
|---|---|---|---|---|
| 5,263,111 A  * | 11/1993 | Nurse | ............... | G02B 6/12002 |
| | | | | 385/130 |
| 7,577,320 B2 * | 8/2009 | Little | .................. | G02B 6/2804 |
| | | | | 385/123 |
| 7,899,280 B2 * | 3/2011 | Little | .................. | G02B 6/2804 |
| | | | | 385/123 |
| 8,948,553 B2 * | 2/2015 | Taillaert | ............ | G02B 6/12007 |
| | | | | 385/129 |
| 9,372,381 B2 * | 6/2016 | Vermeulen | | |
| 2004/0131310 A1 * | 7/2004 | Walker | ................... | G02B 6/125 |
| | | | | 385/29 |
| 2004/0228570 A1 * | 11/2004 | Logvin | .................. | G02B 6/122 |
| | | | | 385/15 |
| 2013/0022312 A1 * | 1/2013 | Taillaert | ............ | G02B 6/12007 |
| | | | | 385/30 |
| 2017/0003454 A1 * | 1/2017 | Baets | .................. | G02B 6/3536 |

* cited by examiner

Primary Examiner — Akm Enayet Ullah

(57) ABSTRACT

A cross waveguide includes a first waveguide and a second waveguide, where the first waveguide and the second waveguide are mutually perpendicular and crosswise disposed, an area formed by a cross part of the first waveguide and the second waveguide is a cross area, the first waveguide and the second waveguide each include a shallow etching part and a core layer, and the shallow etching part is symmetrically distributed on two sides of the core layer in a length direction relative to an axis of the core layer. By appropriately adjusting a width of the core layer or a width of the shallow etching part, an energy loss generated during optical wave transmission in the cross waveguide can be effectively reduced.

10 Claims, 3 Drawing Sheets

CROSS WAVEGUIDE

CROSS-REFERENCE TO RELATED APPLICATIONS

This application is a continuation of International Application No. PCT/CN2014/082325, filed on Jul. 16, 2014, the disclosure of which is hereby incorporated by reference in its entirety.

TECHNICAL FIELD

The present invention relates to the optical communications technologies, and in particular, to a cross waveguide.

BACKGROUND

Since emergence of the first laser, profound reformation has taken place in human communication. As a carrier of information, light enables human communication to be timely and convenient because the light features a high speed and stability. With development of science and technology, disadvantages in aspects of power consumption and a duty cycle gradually appear in conventional module optics. Integration in multiple materials has been tried in optical path design, but is limited in development because of a technology limitation. However, silicon optics draws concern because of its compatibility with a circuit technology. People expect that integrated optics can have a same path as electricity in terms of silicon.

The silicon light can be applied to large-scale and high-density integration due to a high refractive index contrast ratio. In addition, the silicon light can further use a mature complementary metal oxide semiconductor (CMOS) technology of an electric chip, so that the silicon light has a unique advantage. However, an optical path does not have flexibility of the circuit. In a large-scale switch matrix, cross of waveguides cannot be avoided. On a silicon light platform, a cross waveguide is an extremely core device. If a loss value of one cross waveguide is 0.3 dB, and if a quantity of cross waveguides in a switch matrix is 100, a loss caused merely by the cross waveguides is 30 dB, which is a great loss. Therefore, it is extremely necessary to reduce a cross waveguide loss.

In the prior art, an objective of reducing the cross waveguide loss is achieved by using a cross waveguide based on mode broadening. Broadening of an optical wave mode is implemented by using a change of a waveguide structure, that is, a width of a core layer broadens towards a cross area and a shallow etching part increases, so that a change of optical wave field distribution is achieved to reduce optical divergence in the cross area. A cross waveguide based on multimode interference is further used in the prior art, that is, the cross waveguide is a multimode waveguide in the cross area, and is a single-mode waveguide at an input end and an output end, so that the objective of reducing the cross waveguide loss is achieved. That is, waveguides at the input end and the output end of the cross waveguide are single-mode waveguides, and a waveguide in the cross area is a multimode waveguide. Image points generated by means of the multimode interference are used to reduce an optical wave loss in the cross area. However, in the prior art, an extra loss is brought because of a change of field distribution and a change of a waveguide mode.

SUMMARY

Embodiments of the present invention provide a cross waveguide, so as to reduce an extra loss caused due to a change of field distribution and a change of a waveguide mode during optical wave transmission in a cross waveguide in the prior art.

A first aspect of the present invention provides a cross waveguide, including a first waveguide and a second waveguide; where the first waveguide and the second waveguide are mutually perpendicular and crosswise disposed, and an area formed by a cross part of the first waveguide and the second waveguide is a cross area;

the first waveguide and the second waveguide each include a shallow etching part and a core layer, and the shallow etching part is symmetrically distributed on two sides of the core layer in a length direction relative to an axis of the core layer;

one end of the first waveguide is a first input waveguide, the other end is a first output waveguide, one end of the second waveguide is a second input waveguide, and the other end is a second output waveguide;

a core layer in the first input waveguide is disposed to have an equal width, and distances between outer sides of the shallow etching part in the first input waveguide are equal;

a core layer in the second input waveguide is disposed to have an equal width, and distances between outer sides of the shallow etching part in the second input waveguide are equal; and a core layer at one end that is of the first output waveguide and that is close to the cross area is narrower than the core layer in the first input waveguide, a core layer at the other end of the first output waveguide is the same as the core layer in the first input waveguide in terms of width, distances between outer sides of a shallow etching part in the first output waveguide are equal, a core layer at one end that is of the second output waveguide and that is close to the cross area is narrower than the core layer in the second input waveguide, a core layer at the other end of the second output waveguide is the same as the core layer in the second input waveguide in terms of width, and distances between outer sides of a shallow etching part in the second output waveguide are equal; or a distance between outer sides of a shallow etching part at one end that is in the first output waveguide and that is close to the cross area is less than the distance between the outer sides of the shallow etching part in the first input waveguide, a distance between outer sides of a shallow etching part at the other end of the first output waveguide is the same as the distance between the outer sides of the shallow etching part in the first input waveguide, a distance between outer sides of a shallow etching part at one end that is in the second output waveguide and that is close to the cross area is less than the distance between the outer sides of the shallow etching part in the second input waveguide, and a distance between outer sides of a shallow etching part at the other end of the second output waveguide is the same as the distance between the outer sides of the shallow etching part in the second input waveguide.

In a first possible implementation manner of the first aspect, the core layer is thicker than the shallow etching part.

In a second possible implementation manner of the first aspect, the first waveguide and the second waveguide are respectively parallel to the axes.

In a third possible implementation manner of the first aspect, the first output waveguide gradually widens, and the second output waveguide gradually widens.

In a fourth possible implementation manner of the first aspect, the shallow etching part of the first output waveguide gradually widens, and the shallow etching part of the second output waveguide gradually widens.

With reference to any one of the first aspect, or the first to the fourth possible implementation manners of the first aspect, in a fifth possible implementation manner of the first aspect, both the first waveguide and the second waveguide are multimode waveguides.

With reference to any one of the first aspect, or the first to the fourth possible implementation manners of the first aspect, in a sixth possible implementation manner of the first aspect, both the first waveguide and the second waveguide are ridge waveguides.

With reference to any one of the first aspect, or the first to the fourth possible implementation manners of the first aspect, in a seventh possible implementation manner of the first aspect, the shallow etching part is the same as the core layer in terms of material.

With reference to any one of the first aspect, or the first to the seventh possible implementation manners of the first aspect, in an eighth possible implementation manner of the first aspect, distances between a center of the cross area and the two ends of the first waveguide are equal; and distances between the center of the cross area and the two ends of the second waveguide are equal.

A second aspect of the present invention provides a switch matrix, including at least one cross waveguide according to any one of the first aspect, or the first to the eighth implementation manners of the first aspect.

The cross waveguide provided in the embodiments of the present invention includes a first waveguide and a second waveguide, where the first waveguide and the second waveguide are mutually perpendicular and crosswise disposed, an area formed by a cross part of the first waveguide and the second waveguide is a cross area, the first waveguide and the second waveguide each include a shallow etching part and a core layer, and the shallow etching part is symmetrically distributed on two sides of the core layer in a length direction relative to an axis of the core layer. By appropriately adjusting a width of the core layer or a width of the shallow etching part, an energy loss generated during optical wave transmission in the cross waveguide can be effectively reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

Figure 1:
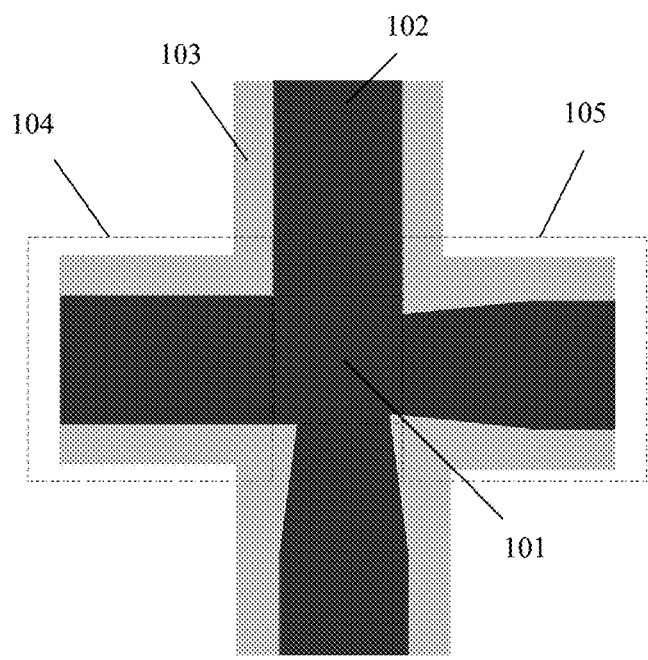
FIG. 1 is a schematic structural diagram of a cross waveguide according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention provide a cross waveguide, including a first waveguide and a second waveguide.

The first waveguide and the second waveguide are mutually perpendicular and crosswise disposed, and an area formed by a cross part of the first waveguide and the second waveguide is a cross area.

The first waveguide and the second waveguide each include a shallow etching part and a core layer, and the shallow etching part is symmetrically distributed on two sides of the core layer in a length direction relative to an axis of the core layer.

One end of the first waveguide is a first input waveguide, the other end is a first output waveguide. One end of the second waveguide is a second input waveguide, and the other end is a second output waveguide.

A core layer in the first input waveguide is disposed to have an equal width, and distances between outer sides of the shallow etching part in the first input waveguide are equal.

A core layer in the second input waveguide is disposed to have an equal width, and distances between outer sides of the shallow etching part in the second input waveguide are equal.

A core layer at one end that is of the first output waveguide and that is close to the cross area is narrower than the core layer in the first input waveguide, a core layer at the other end of the first output waveguide is the same as the core layer in the first input waveguide in terms of width, distances between outer sides of a shallow etching part in the first output waveguide are equal, a core layer at one end that is of the second output waveguide and that is close to the cross area is narrower than the core layer in the second input waveguide, a core layer at the other end of the second output waveguide is the same as the core layer in the second input waveguide in terms of width, and distances between outer sides of a shallow etching part in the second output waveguide are equal.

Alternatively, a distance between outer sides of a shallow etching part at one end that is in the first output waveguide and that is close to the cross area is less than the distance between the outer sides of the shallow etching part in the first input waveguide, a distance between outer sides of a shallow etching part at the other end of the first output waveguide is the same as the distance between the outer sides of the shallow etching part in the first input waveguide, a distance between outer sides of a shallow etching part at one end that is in the second output waveguide and that is close to the cross area is less than the distance between the outer sides of the shallow etching part in the second input waveguide, and a distance between outer sides of a shallow etching part at the other end of the second output waveguide is the same as the distance between the outer sides of the shallow etching part in the second input waveguide.

The cross waveguide provided in the embodiments of the present invention includes a first waveguide and a second waveguide, where the first waveguide and the second waveguide are mutually perpendicular and crosswise disposed, an area faulted by a cross part of the first waveguide and the second waveguide is a cross area, the first waveguide and the second waveguide each include a shallow etching part and a core layer, and the shallow etching part is symmetrically distributed on two sides of the core layer in a length direction relative to an axis of the core layer. By appropriately adjusting a width of the core layer or a width of the shallow etching part, an energy loss generated during optical wave transmission in the cross waveguide can be effectively reduced.

FIG. 1 is a schematic structural diagram of a cross waveguide according to Embodiment 1 of the present invention. The cross waveguide provided in this embodiment of the present invention is applied to a scenario of changing a width of a core layer in an output waveguide. As shown in FIG. 1, the cross waveguide provided in this embodiment includes a first waveguide and a second waveguide.

The first waveguide and the second waveguide are mutually perpendicular and crosswise disposed, an area formed by a cross part of the first waveguide and the second waveguide is a cross area 101, the first waveguide and the second waveguide each include a shallow etching part 103 and a core layer 102, and the shallow etching part is symmetrically distributed on two sides of the core layer in a length direction relative to an axis of the core layer.

The shallow etching part is the same as the core layer in terms of material, which is silicon. In an initial stage of waveguide manufacturing, an original waveguide is a silicon board. First, an area of a first waveguide and an area of a second waveguide are determined in the waveguide, and no processing is performed on this part of the waveguide. Then an area of a shallow etching part is determined around the first waveguide and the second waveguide, and this part of the waveguide is evenly etched. Etched waveguide is thinner than the first waveguide and the second waveguide, and the shallow etching part is formed after etching. Further, other parts in the silicon board except the area of the first waveguide, the area of the second waveguide, and the shallow etching part are removed. Finally, the processed silicon board is covered by using silicon dioxide, to form a coverage layer, that is, to form the cross waveguide in this embodiment.

Further, the first waveguide and the second waveguide are respectively parallel to the axes.

One end of the first waveguide is a first input waveguide 104, and the other end of the first waveguide is a first output waveguide 105, that is, the first waveguide includes the first input waveguide 104, the cross area 101, and the first output waveguide 105.

As shown in FIG. 1, a core layer in the first input waveguide 104 is disposed to have an equal width. A core layer at one end that is of the first output waveguide 105 and that is close to the cross area 101 is narrower than a core layer in the first input waveguide 104. A core layer at the other end of the first output waveguide 105, that is, a core layer at an end facing away from the cross area 101, is the same as the core layer in the first input waveguide 104 in terms of width. Distances between outer sides of a shallow etching part that is symmetrically distributed around the core layer of the first input waveguide 104 are equal, and distances between outer sides of a shallow etching part that is symmetrically distributed around the core layer of the first output waveguide 105 are also equal, that is, as shown in FIG. 1, a shallow etching part is evenly distributed on two sides of a core layer in a length direction, and distances between outmost sides of the shallow etching part on the two sides are equal.

The second waveguide perpendicular to the first waveguide has a same structure as the first waveguide, that is, one end of the second waveguide is a second input waveguide, the other end of the second waveguide is a second output waveguide, and a core layer and a shallow etching part in the second waveguide are the same as the core layer and the shallow etching part in the first waveguide in terms of structure and width. Details are not described again.

Specifically, as shown in FIG. 1, the first waveguide is a waveguide placed horizontally in FIG. 1, the second waveguide is a waveguide placed vertically in FIG. 1, and the first waveguide and the second waveguide are perpendicularly and crosswise placed. Because the first waveguide and the second waveguide are perpendicularly and crosswise disposed, the cross area 101 is formed. In addition, distances between a center of the cross area 101 and two ends of the first waveguide are equal, distances between the center of the cross area 101 and two ends of the second waveguide are also equal, and the first waveguide is equal to the second waveguide in length. The cross waveguide shown in FIG. 1 further includes a coverage layer. The coverage layer is used to wrap up the core layer and the shallow etching part that correspond to the first waveguide, and the core layer and the shallow etching part that correspond to the second waveguide. The coverage layer is specifically used to keep, in an optical wave transmission process, an optical wave in the core layer for transmission.

Further, both the first waveguide and the second waveguide are multimode waveguides, that are, waveguides that can be used for transmission in multiple modes (usually more than three modes) at the same time. When an optical wave is transmitted in the first input waveguide 104 of the first waveguide, it is equivalent to that the optical wave is transmitted in a strip waveguide, and when the optical wave is transmitted in the strip waveguide, the strip waveguide is equivalent to a three-dimensional waveguide, that is, the strip waveguide has an x direction, a y direction, and a z direction. The optical wave is propagated in the z direction and is limited in the x direction and the y direction on an x-y plane perpendicular to the z direction. Therefore, it can be considered that the optical wave is transmitted in a three-dimensional waveguide with two-dimensional limitation.

When the optical wave is transmitted from the first input waveguide 104 to the cross area 101, because a waveguide structure changes, that is, a waveguide in a direction perpendicular to an optical wave transmission direction dramatically widens, in this case, it is equivalent to that the optical wave is transmitted from the strip waveguide to a slab waveguide. When the optical wave is transmitted in the slab waveguide, the slab waveguide is equivalent to a two-dimensional waveguide, that is, the slab waveguide has an x direction and a y direction. The optical wave is propagated in the x direction and is merely limited in the y direction perpendicular to the x direction. Therefore, it can be considered that the optical wave is transmitted in a two-dimensional waveguide with one-dimensional limitation. In this case, it is equivalent to that the optical wave is transmitted from a three-dimensional waveguide with two-dimensional limitation to a two-dimensional waveguide with one-dimensional limitation, which inevitably results in optical wave divergence, that is, divergence of some optical waves to a broadening waveguide, thereby causing an optical wave loss.

In the prior art, a cross waveguide based on multimode interference (MMI) is generally used to reduce optical wave divergence in the cross area. Specifically, waveguides at an input end and an output end of the MMI cross waveguide are single-mode waveguides, and a waveguide in a cross area is a multimode waveguide, and an image point generated by means of multimode interference is used to reduce an optical wave loss in the cross area. When the optical wave is input from the input end to the cross waveguide, first, the optical wave passes through the single-mode waveguide, then enters the multimode waveguide, and motivates multiple modes in the multimode waveguide. Interference occurs between modes, and periodic distribution of image points in an incident waveguide is formed. The image points of the input waveguide are exactly in the cross area. In this case, a beam is focalized and divergence is reduced. After passing through the cross area, the optical wave in the multimode waveguide is output through the single-mode waveguide. A structure of the MMI-based cross waveguide is designed by using a multimode interference imaging method. However, a size of the image point that is of the MMI-based cross waveguide and generated in the cross area is not totally equal to a size of an optical wave in the input waveguide, and some optical waves may still be diverged due to a sudden change of a waveguide type in the cross area. In addition, a loss also exists when the optical wave is transmitted from the single-mode waveguide to the multimode waveguide.

In the cross waveguide provided in this embodiment of the present invention shown in FIG. 1, first, because a ratio of a width of a mode field during optical wave transmission in a multimode waveguide to a physical width of a waveguide entity is reduced, a loss generated during optical wave transmission in a cross area formed by multimode waveguides is less than a loss generated during optical wave transmission in a cross area formed by single-mode waveguides. Therefore, both the first waveguide and the second waveguide in this embodiment of the present invention are multimode waveguides. Second, in a waveguide merely including a core layer and a coverage layer and excluding a shallow etching part, a material of the core layer is silicon, and a material of the coverage layer is silicon dioxide; a refractive index of the silicon is 3.42, a refractive index of the silicon dioxide is 1.4, and when the optical wave is transmitted in the waveguide and enters a cross waveguide area, a refractive index of a material has a relatively large change due to a great sudden change in a waveguide structure, thereby causing optical wave divergence. Therefore, there is a shallow etching part distributed around the core layer of the waveguide in this embodiment of the present invention, and the shallow etching part has the same material as the core layer. In this way, a refractive index of another part in the waveguide except the core layer is increased, so that when the optical wave is transmitted in the waveguide and enters the cross waveguide area, the refractive index of the material has a relatively small change, and an objective of reducing optical wave divergence and an optical wave loss can be achieved.

Specifically, because the first waveguide is a multimode waveguide, a loss of optical wave energy caused when the optical wave is transmitted from the single-mode waveguide to the multimode waveguide is not brought. When the optical wave is transmitted in the three-dimensional waveguide with two-dimensional limitation, that is, when the optical wave is transmitted in the first input waveguide 104, because a relatively wide shallow etching part with a same material as the core layer is distributed around the core layer of the first input waveguide 104, a refractive index of a part except the core layer is relatively increased, so that the optical wave can be more limited to be transmitted in the core layer. In addition, when the optical wave is transmitted from the first input waveguide 104 to the cross area 101, compared with the single-mode waveguide, optical wave divergence in the cross area 101 is reduced due to a change of the ratio of the width of the mode field during optical wave transmission to the physical width of the waveguide entity. In addition, in the first input waveguide 104, the core layer is disposed to have an equal width, and the shallow etching part is also disposed to have an equal width, so that an energy loss brought by a mode field change during optical wave transmission due to a change of a core layer width can be avoided.

When the optical wave is output from the cross area 101 to the first output waveguide 105, it is equivalent to that the optical wave is transmitted from the two-dimensional waveguide with one-dimensional limitation to the three-dimensional waveguide with two-dimensional limitation. In this case, an optical wave mode field changes again. Therefore, the core layer at the end that is of the first output waveguide 105 and that is close to the cross area 101 is set to be narrower than the core layer of the first input waveguide 104, the core layer at the other end of the first output waveguide 105 is equal to the core layer of the first input waveguide 104 in terms of width, and a width of the core layer in the first output waveguide 105 changes gradually. This structure can reduce divergence caused when the optical wave is transmitted from the cross area 101 to the first output waveguide 105, so that a loss generated during the optical wave transmission in the cross waveguide can be further reduced. In addition, a shallow etching part is disposed around the core layer of the first output waveguide 105, so that the optical wave can be more limited to be transmitted in the core layer of the first output waveguide 105, thereby reducing an energy loss generated during optical wave transmission.

When the optical wave is transmitted in the second waveguide, a structure of the second waveguide and a principle of reducing an optical wave loss are the same as that of the first waveguide, and details are not described herein again.

Further, the first waveguide may be a ridge waveguide; and the second waveguide may also be a ridge waveguide.

Further, materials of the core layer and the shallow etching part that are in the cross waveguide provided in this embodiment of the present invention are silicon, and a material of the coverage layer is silicon dioxide.

Figure 2:
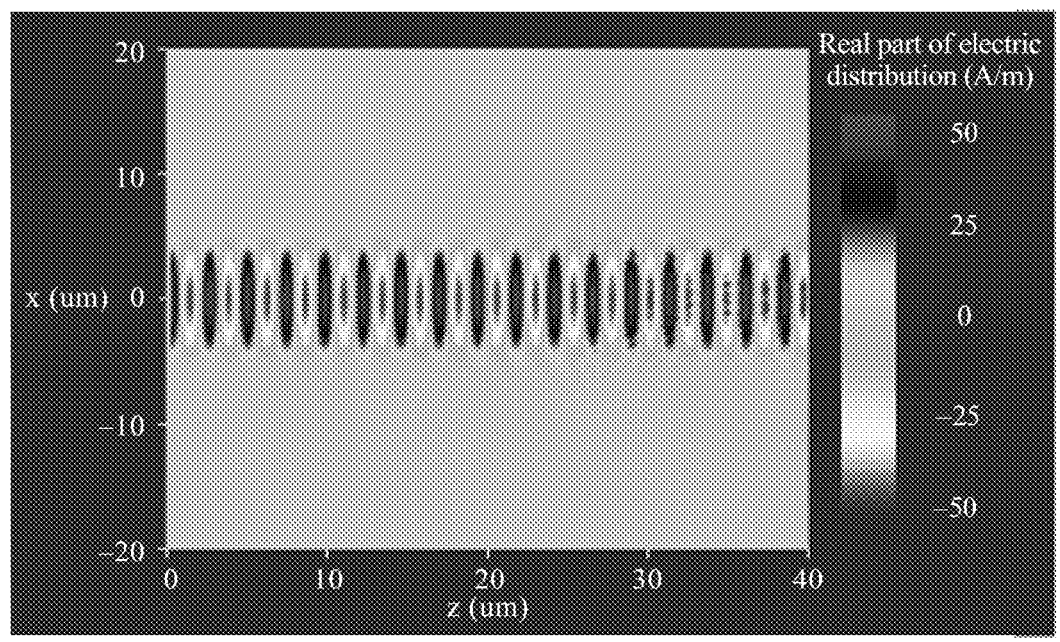
FIG. 2 is a diagram of an electric field distribution emulation result in a cross waveguide according to Embodiment 1 of the present invention.

In addition, to further clearly compare a loss reduction effect of the cross waveguide in the present invention with a loss reduction effect of a cross waveguide in the prior art, the following performs an emulation test on energy loss performance of the cross waveguide provided in the present invention. An electric field distribution emulation result of the cross waveguide provided in this embodiment of the present invention is shown in FIG. 2.

In emulation data, the waveguide is thin silicon whose core layer thickness is 220 nm, a width of a waveguide core layer at an incident end is 10 um, a width of a shallow etching part is 14 um, and a fundamental-mode optical wave is used to pass through the cross waveguide. A lateral axis is a propagation direction of the optical wave, and a longitudinal axis is a direction perpendicular to the propagation direction of the optical wave. The cross area of the cross waveguide ranges from 15 um to 25 um. It can be learned from FIG. 2 that when the optical wave is transmitted in the cross waveguide, a degree of divergence, in the entire cross waveguide, of an electric field generated by the optical wave is obviously reduced compared with the electric field in a cross area of a single-mode waveguide, and especially, almost no divergence occurs in the cross area, that is, the electric field in FIG. 2 remains unchanged from left to right. This indicates that a loss of the device is very small.

Figure 3:
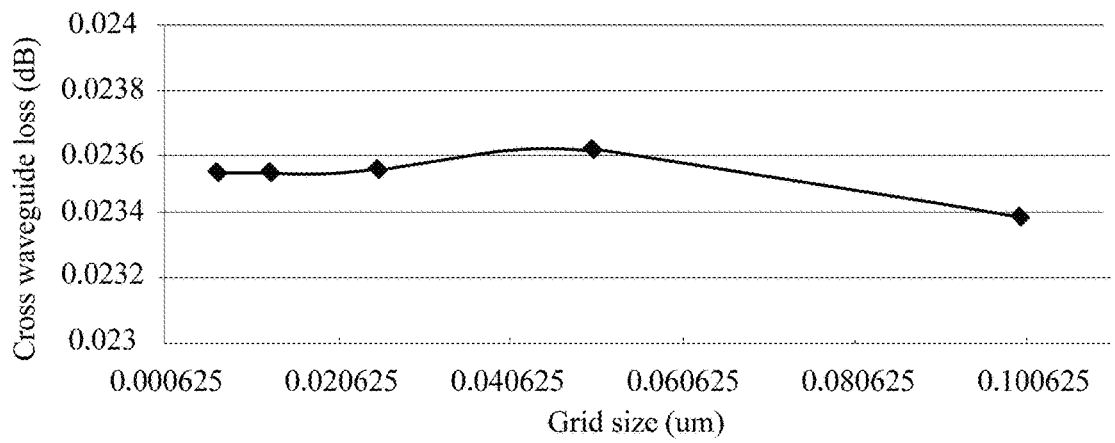
FIG. 3 is a result of numerical stability research performed by using a BPM.
Figure 4:
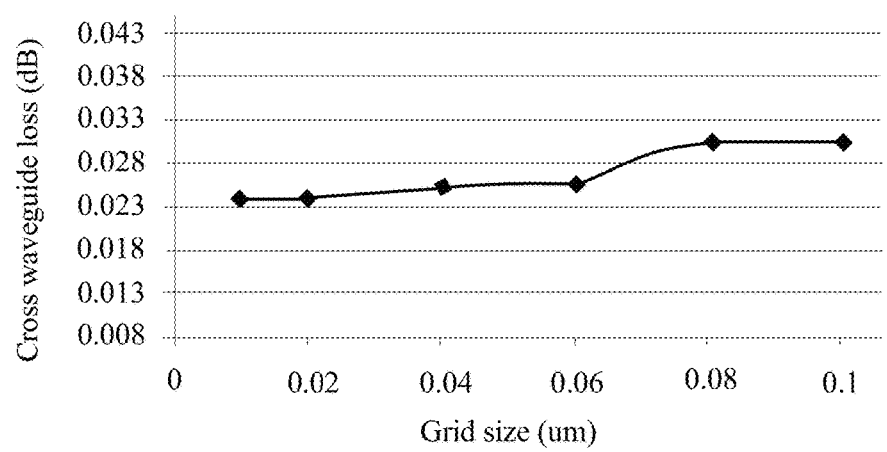
FIG. 4 is a result of numerical stability research performed by using an FDTD.

Because the loss of the device is very small, stability research needs to be performed on the numerical emulation result, so as to ensure that the obtained result is stable and reliable. FIG. 3 is a result of numerical stability research performed by using a beam propagation method (BPM). FIG. 4 is a result of numerical stability research performed by using a finite-difference time-domain (FDTD) method.

A longitudinal axis is a loss generated during optical wave transmission from an input end in the cross waveguide to an output end in the cross waveguide, and a lateral axis is a size of a selected grid. The grid reflects precision of an emulation image. Emulation precision is relatively high when the grid is set to be relatively small. It can be learned from FIG. 3 and FIG. 4 that in a process of optical wave transmission in the cross waveguide, the result of numerical stability analysis performed by using the BPM well coincides with the result of numerical stability analysis performed by using the FDTD. This indicates that the obtained result is credible. In addition, it can be learned from the emulation results in FIG. 3 and FIG. 4 that a loss of the cross waveguide is 0.023 dB.

The cross waveguide provided in this embodiment of the present invention includes a first waveguide and a second waveguide, where the first waveguide and the second waveguide are mutually perpendicular and crosswise disposed, an area formed by a cross part of the first waveguide and the second waveguide is a cross area, the first waveguide and the second waveguide each include a shallow etching part and a core layer, and the shallow etching part is symmetrically distributed on two sides of the core layer in a length direction relative to an axis of the core layer. An input end is disposed to have an equal width, and a width of a core layer at an output end is appropriately adjusted, so that an energy loss generated during optical wave transmission in the cross waveguide can be effectively reduced.

Figure 5:
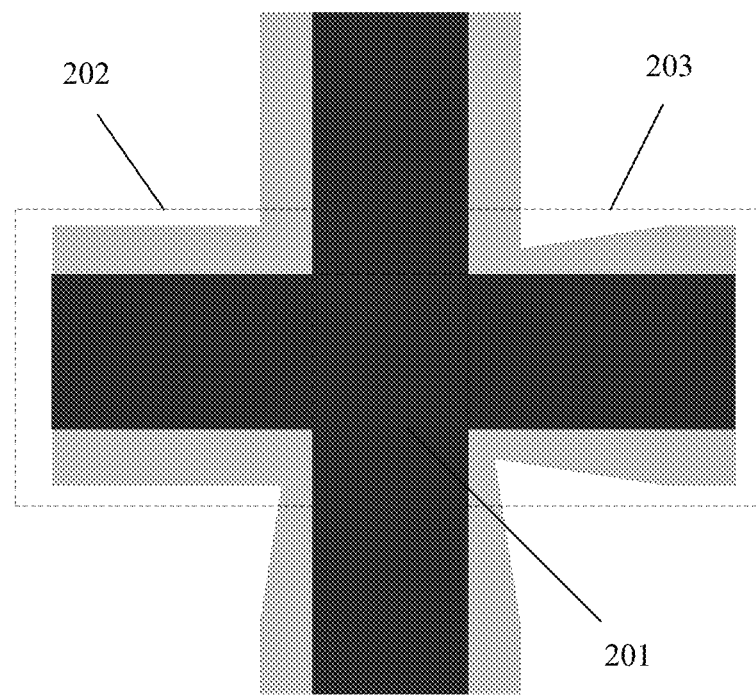
FIG. 5 is a schematic structural diagram of a cross waveguide according to Embodiment 2 of the present invention.

FIG. 5 is a schematic structural diagram of a cross waveguide according to Embodiment 2 of the present invention. The cross waveguide provided in this embodiment of the present invention is applied to a scenario of changing a width of a shallow etching part in an output waveguide. As shown in FIG. 5, the cross waveguide provided in this embodiment of the present invention includes a first waveguide and a second waveguide. The first waveguide and the second waveguide are perpendicularly and crosswise disposed to form a cross area 201, and the first waveguide and the second waveguide each include a shallow etching part and a core layer. Composition of the first waveguide and the second waveguide is the same as that in the cross waveguide shown in FIG. 1. In addition, a principle of reducing an optical wave loss by the cross waveguide provided in this embodiment of the present invention is the same as a principle of reducing an optical wave loss by the cross waveguide shown in FIG. 1, and details are not described herein again.

One end of the first waveguide is a first input waveguide 202, the other end of the first waveguide is a first output waveguide 203. One end of the second waveguide is a second input waveguide, and the other end of the second waveguide is a second output waveguide.

As shown in FIG. 5, widths of core layers of the first waveguide and the second waveguide in the cross waveguide provided in this embodiment of the present invention are the same. In an entire structure, the widths of the core layers remain unchanged, and only a width of a shallow etching part in the first output waveguide 203 and a width of a shallow etching part in the second output waveguide are changed. That is, a distance between outer sides of a shallow etching part at one end that is in the first output waveguide 203 and that is close to the cross area 201 is less than a distance between outer sides of a shallow etching part in the first input waveguide 202, a distance between outer sides of a shallow etching part at the other end of the first output waveguide 203 is the same as the distance between the outer sides of the shallow etching part in the first input waveguide 202, and a distance between shallow etching parts gradually widens. The second waveguide has a same structure as the first waveguide, that is, a distance between outer sides of a shallow etching part at one end that is in the second output waveguide and that is close to the cross area is less than a distance between outer sides of a shallow etching part in the second input waveguide, and a distance between outer sides of a shallow etching part at the other end of the second output waveguide is the same as the distance between the outer sides of the shallow etching part in the second input waveguide. Because a width of the shallow etching part directly affects a relative refractive index of a coverage layer, by using this structure, widths of shallow etching parts in the first output waveguide 203 and the second output waveguide are optimized, so that a divergence loss generated when the optical wave enters an output waveguide after passing through the cross area can be reduced.

In addition, to further clearly compare a loss reduction effect of the cross waveguide in the present invention with a loss reduction effect of a cross waveguide in the prior art, the following performs an emulation test on energy loss performance of the cross waveguide provided in the present invention. In emulation, a waveguide whose core layer thickness is 220 nm is used, a material of the waveguide is silicon, a width of a core layer at an incident end is 10 um, a width of a core layer at an output end is 10 um, and a distance between outer sides of a shallow etching part at an input end is 14 um. In addition, a fundamental-mode optical wave is used to pass through the cross waveguide. A lateral axis is a propagation direction of an optical wave, and a longitudinal axis is a direction perpendicular to the propagation direction of the optical wave. When the optical wave is transmitted in the cross waveguide, a degree of divergence, in the entire cross waveguide, of an electric field generated by the optical wave is obviously reduced compared with that in the prior art, and especially, almost no divergence occurs in the cross area, that is, the electric field remains unchanged. This indicates that a loss of the device is very small.

The cross waveguide provided in this embodiment of the present invention includes a first waveguide and a second waveguide, where the first waveguide and the second waveguide are mutually perpendicular and crosswise disposed, an area formed by a cross part of the first waveguide and the second waveguide is a cross area, the first waveguide and the second waveguide each include a shallow etching part and a core layer, and the shallow etching part is symmetrically distributed on two sides of the core layer in a length direction relative to an axis of the core layer. An input end is disposed to have an equal width, and a width of a shallow etching part at an output end is appropriately adjusted, so that an energy loss generated during optical wave transmission in the cross waveguide can be effectively reduced.

Another embodiment of the present invention provides a switch matrix, including at least one cross waveguide shown in FIG. 1 or FIG. 5. An implementation principle and a technical effect of the cross waveguide are similar, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A cross waveguide, comprising:
a first waveguide and a second waveguide, wherein:
the first waveguide and the second waveguide are mutually perpendicular and crosswise disposed, and an area formed by a cross part of the first waveguide and the second waveguide is a cross area;
the first waveguide and the second waveguide each comprise a shallow etching part and a core layer, and the shallow etching part is symmetrically distributed on two sides of the core layer in a length direction relative to an axis of the core layer;
one end of the first waveguide is a first input waveguide, the other end is a first output waveguide, one end of the second waveguide is a second input waveguide, and the other end is a second output waveguide;
the core layer in the first input waveguide is disposed to have an equal width, and distances between outer sides of the shallow etching part in the first input waveguide are equal;
the core layer in the second input waveguide is disposed to have an equal width, and distances between outer sides of the shallow etching part in the second input waveguide are equal; and
the core layer at one end of the first output waveguide and close to the cross area is narrower than the core layer in the first input waveguide, and the core layer at the other end in the first output waveguide is the same as the core layer in the first input waveguide in terms of width, distances between outer sides of the shallow etching part in the first output waveguide are equal, and the core layer at one end in the second output waveguide and close to the cross area is narrower than the core layer in the second input waveguide, and the core layer at the other end in the second output waveguide is the same as the core layer in the second input waveguide in terms of width, and distances between outer sides of the shallow etching part in the second output waveguide are equal; or a distance between outer sides of the shallow etching part at one end in the first output waveguide and close to the cross area is less than the distance between the outer sides of the shallow etching part in the first input waveguide, a distance between outer sides of the shallow etching part at the other end in the first output waveguide is the same as the distance between the outer sides of the shallow etching part in the first input waveguide, a distance between outer sides of the shallow etching part at one end in the second output waveguide and close to the cross area is less than the distance between the outer sides of the shallow etching part in the second input waveguide, and a distance between outer sides of the shallow etching part at the other end in the second output waveguide is the same as the distance between the outer sides of the shallow etching part in the second input waveguide.

2. The cross waveguide according to claim 1, wherein the core layer is thicker than the shallow etching part.

3. The cross waveguide according to claim 1, wherein the first waveguide and the second waveguide are respectively parallel to the axes.

4. The cross waveguide according to claim 1, wherein the first output waveguide gradually widens, and the second output waveguide gradually widens.

5. The cross waveguide according to claim 1, wherein the shallow etching part of the first output waveguide gradually widens, and the shallow etching part of the second output waveguide gradually widens.

6. The cross waveguide according to claim 1, wherein both the first waveguide and the second waveguide are multimode waveguides.

7. The cross waveguide according to claim 1, wherein both the first waveguide and the second waveguide are ridge waveguides.

8. The cross waveguide according to claim 1, wherein the shallow etching part is the same as the core layer in terms of material.

9. The cross waveguide according to claim 1, wherein distances between a center of the cross area and the two ends of the first waveguide are equal; and
distances between the center of the cross area and the two ends of the second waveguide are equal.

10. A switch matrix, comprising at least one cross waveguide according to claim 1.

* * * * *